P. E. NORRIS.
TERMINAL STRUCTURE FOR ELECTRIC BATTERIES.
APPLICATION FILED FEB. 18, 1920.
1,352,619.                                Patented Sept. 14, 1920.
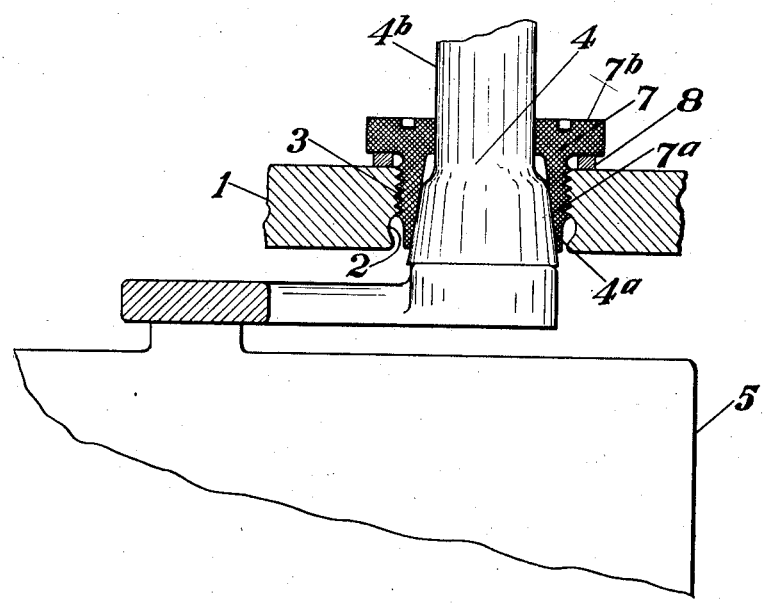
Paul E. Norris,
INVENTOR,
BY
HIS ATTORNEY.

UNITED STATES PATENT OFFICE.

PAUL E. NORRIS, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

TERMINAL STRUCTURE FOR ELECTRIC BATTERIES.

1,352,619.  Specification of Letters Patent.  Patented Sept. 14, 1920.

Application filed February 18, 1920. Serial No. 359,533.

*To all whom it may concern:*

Be it known that I, PAUL E. NORRIS, a citizen of the United States, residing at Pittsburgh, in the county of Allegheny and State of Pennsylvania, have invented certain new and useful Improvements in Terminal Structures for Electric Batteries, of which the following is a specification.

My invention relates to electric batteries, and particularly to terminal structures for such batteries. Structures embodying my invention are particularly well adapted for, though not limited to, batteries of the secondary or storage class.

One object of my invention is the provision of a simple and compact structure which is effective to prevent leakage of the battery liquid, and which can readily be disassembled to permit renewal of the packing without destruction of or damage to any of the parts.

I will describe one form of terminal structure embodying my invention, and will then point out the novel features thereof in claims.

The accompanying drawing is a view showing in vertical section one form of terminal structure embodying my invention.

Referring to the drawing, the reference character 1 designates the cell cover or top plate of a battery cell, which cover is provided with a round aperture 2 having screw threads 3. Projecting through the aperture 2 is a terminal post 4 the lower end of which is attached in suitable manner to one of the sets of battery plates 5. This post is formed with a tapered section 4ª adjacent the cell cover, and a cylindrical section 4ᵇ above the tapered section, the cylindrical section having a diameter at least as small as the smallest diameter of the tapered section. The taper of section 4ª is slight, so that the sides of this section form a very acute angle with the vertical, that is, with the longitudinal axis of the post.

Surrounding the post 4 is a follower which is designated as a whole by the reference character 7. This follower comprises a body part 7ª which is threaded to screw into the aperture 2, and which has an inner tapered surface corresponding to the taper of section 4ª of the terminal post. The follower also comprises a head portion 7ᵇ which is sleeved on the cylindrical section 4ᵇ of the terminal post, and which overlaps part of the cell cover 1. Located between the cell cover and the head 7ᵇ is a gasket 8 of suitable material such as soft rubber.

To assemble the structure, the gasket 8 is first placed in position, and the follower 7 is then screwed into the aperture 2. The downward movement of the follower causes the two tapered surfaces to engage each other with considerable pressure, and this pressure can be varied to a high degree of refinement owing to the slight degree of the taper. The pressure between these surfaces effectively prevents the leakage of liquid between the post 4 and the follower 7, and the gasket 8 prevents the leakage of liquid between the follower and the cover 1. These being the only possible paths for leakage in so far as the terminal structure is concerned, it follows that the structure is completely sealed.

The gasket 8 can be renewed by merely withdrawing the follower, placing a new gasket in position, and replacing the follower. This procedure obviously does not destroy or damage any part of the structure.

Although I have herein shown and described only one form of terminal structure embodying my invention, it is understood that various changes and modifications may be made therein within the scope of the appended claims without departing from the spirit and scope of my invention.

Having thus described my invention, what I claim is:

1. In an electric battery, an apertured cell cover, a tapered terminal post passing through said aperture, a follower screwing into said aperture and having an inner tapered surface engaging with said terminal post, and a gasket between the cell cover and the head of said follower.

2. In an electric battery, an apertured cell cover, a tapered terminal post passing through the aperture in said cover, a follower screwing into said aperture and having an inside tapered surface engaging with said terminal post, said follower comprising a head overlapping part of said cell cover, and a gasket located between said cell cover and the head of the follower.

3. In an electric battery, an apertured cell cover, a terminal post passing through the aperture in said cover and comprising a tapered section adjacent said aperture and a cylindrical section above such tapered section, a follower screwed into said aperture and having a body the inner surface of which is tapered to engage with the tapered section of said post, the follower also comprising a head sleeved over the cylindrical portion of the post and overlapping the cell cover, and a gasket located between the cell cover and the head of said follower.

4. In an electric battery, an apertured cell cover, a terminal post passing through the aperture in said cover and comprising a tapered section adjacent said aperture and a cylindrical section above such tapered section, the surface of said tapered section forming an acute angle with the vertical, a follower screwed into said aperture and having a body the inner surface of which is tapered to engage with the tapered section of said post, the follower also comprising a head sleeved over the cylindrical portion of the post and overlapping the cell cover, and a gasket located between the cell cover and the head of said follower.

5. In an electric battery, an apertured cell cover, a tapered terminal post passing through the aperture in said cover, a follower adapted to be driven into said aperture and having an inside tapered surface engaging with said terminal post, said follower also having a head overlapping part of said cell cover, and a gasket located between said cell cover and said follower head.

In testimony whereof I affix my signature.

PAUL E. NORRIS.